United States Patent
Kai et al.

(10) Patent No.: US 12,227,689 B2
(45) Date of Patent: Feb. 18, 2025

(54) PLATY CHEMICAL HEAT-STORAGE OBJECT

(71) Applicant: MITSUBISHI POWER, LTD., Yokohama (JP)

(72) Inventors: Keiichiro Kai, Yokohama (JP); Masashi Kiyosawa, Yokohama (JP); Koichi Yokoyama, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 770 days.

(21) Appl. No.: 17/415,763

(22) PCT Filed: Dec. 19, 2019

(86) PCT No.: PCT/JP2019/049770
§ 371 (c)(1),
(2) Date: Jun. 18, 2021

(87) PCT Pub. No.: WO2020/130066
PCT Pub. Date: Jun. 25, 2020

(65) Prior Publication Data
US 2022/0112421 A1    Apr. 14, 2022

(30) Foreign Application Priority Data

Dec. 20, 2018  (JP) .................. 2018-238643

(51) Int. Cl.
*C09K 5/16*         (2006.01)
*B32B 1/00*         (2006.01)
(Continued)

(52) U.S. Cl.
CPC .............. *C09K 5/16* (2013.01); *B32B 1/00* (2013.01); *B32B 3/266* (2013.01); *B32B 3/28* (2013.01);
(Continued)

(58) Field of Classification Search
None
See application file for complete search history.

(56) References Cited

U.S. PATENT DOCUMENTS

| | | | |
|---|---|---|---|
| 4,290,789 A * | 9/1981 | Newton | F24F 3/1423 |
| | | | 55/408 |
| 5,451,307 A * | 9/1995 | Bennett | C25B 11/03 |
| | | | 204/290.13 |

(Continued)

FOREIGN PATENT DOCUMENTS

| | | | | |
|---|---|---|---|---|
| CN | 104650820 A * | 5/2015 | | C09K 5/16 |
| CN | 104650821 A * | 5/2015 | | C09K 5/16 |

(Continued)

OTHER PUBLICATIONS

Machine Translation of JP-08029081-A, Feb. 1996 (Year: 1996).*

(Continued)

*Primary Examiner* — Jeffrey A Vonch
(74) *Attorney, Agent, or Firm* — WHDA, LLP

(57) ABSTRACT

A plate-shaped chemical heat storage comprising a substrate composed of a net made of metal and a heat storage material composition supported on the substrate, wherein the heat storage material composition comprises at least one selected from the group consisting of magnesium hydroxide or oxide, strontium hydroxide or oxide, barium hydroxide or oxide, calcium hydroxide or oxide, and calcium sulfate, and optionally at least one selected from the group consisting of titanium dioxide, silicon dioxide, alumina silicate fiber, E-glass fiber and cellulose.

20 Claims, 5 Drawing Sheets

(51) Int. Cl.
  *B32B 3/24* (2006.01)
  *B32B 3/26* (2006.01)
  *B32B 3/28* (2006.01)
  *B32B 5/16* (2006.01)
  *F28D 20/00* (2006.01)
  *F28F 3/00* (2006.01)
  *F28F 3/02* (2006.01)
  *B32B 3/30* (2006.01)

(52) U.S. Cl.
  CPC .............. *B32B 5/16* (2013.01); *F28D 20/003* (2013.01); *F28F 3/00* (2013.01); *F28F 3/025* (2013.01); *B32B 3/30* (2013.01); *B32B 2255/06* (2013.01); *B32B 2255/20* (2013.01); *B32B 2255/24* (2013.01); *B32B 2260/02* (2013.01); *B32B 2260/04* (2013.01); *B32B 2260/046* (2013.01); *B32B 2262/10* (2013.01); *B32B 2262/101* (2013.01); *B32B 2264/102* (2013.01); *B32B 2264/104* (2013.01); *B32B 2305/38* (2013.01); *B32B 2307/30* (2013.01); *B32B 2307/302* (2013.01); *Y02E 60/14* (2013.01); *Y10T 428/12361* (2015.01); *Y10T 428/12368* (2015.01); *Y10T 428/12493* (2015.01); *Y10T 428/24273* (2015.01); *Y10T 428/24281* (2015.01); *Y10T 428/24322* (2015.01); *Y10T 428/24331* (2015.01); *Y10T 428/24339* (2015.01); *Y10T 428/24347* (2015.01); *Y10T 428/24661* (2015.01); *Y10T 428/24669* (2015.01); *Y10T 428/24711* (2015.01); *Y10T 428/24727* (2015.01)

(56) References Cited

U.S. PATENT DOCUMENTS

| | | | |
|---|---|---|---|
| 2002/0017380 A1 | 2/2002 | Jonsson et al. | |
| 2007/0256736 A1* | 11/2007 | Tonkovich | A61P 17/00 137/92 |
| 2009/0199994 A1* | 8/2009 | Amano | F28D 20/023 165/10 |
| 2009/0326279 A1* | 12/2009 | Tonkovich | B01F 25/4317 422/198 |
| 2010/0252248 A1* | 10/2010 | Shimazu | F28D 20/003 165/185 |
| 2014/0305142 A1* | 10/2014 | Aman | F28D 20/003 126/263.01 |
| 2016/0327315 A1* | 11/2016 | Masuzawa | F28F 1/126 |
| 2017/0087799 A1 | 3/2017 | Buttner et al. | |
| 2017/0089646 A1* | 3/2017 | Kawazoe | C09K 5/063 |
| 2017/0284746 A1 | 10/2017 | Miwa et al. | |
| 2017/0370656 A1* | 12/2017 | Kawazoe | B32B 5/18 |
| 2018/0072934 A1* | 3/2018 | Kono | C09K 5/16 |
| 2018/0073816 A1 | 3/2018 | Shamberger et al. | |
| 2019/0106612 A1* | 4/2019 | Koseki | C08K 9/10 |
| 2019/0219340 A1* | 7/2019 | De Jong | F28D 20/003 |
| 2019/0310026 A1* | 10/2019 | Chopard | F28F 3/046 |

FOREIGN PATENT DOCUMENTS

| | | | | |
|---|---|---|---|---|
| DE | 202016103148 U1 | * | 9/2016 | |
| EP | 2551325 A1 | * | 1/2013 | ............ C04B 33/04 |
| EP | 2749831 A2 | * | 7/2014 | ........... F28D 20/003 |
| EP | 2781871 A2 | * | 9/2014 | ........... F28D 20/003 |
| EP | 3279288 B1 | | 2/2018 | |
| GB | 1572680 A | * | 7/1980 | ........... F24S 10/501 |
| JP | 57155098 A | * | 9/1982 | |
| JP | 62-204099 A | | 9/1987 | |
| JP | 8-29081 A | | 2/1996 | |
| JP | 08029081 A | * | 2/1996 | ............. F28D 20/02 |
| JP | 2005134101 A | * | 5/2005 | ............. F28D 20/00 |
| JP | 2007247928 A | * | 9/2007 | |
| JP | 2008063547 A | * | 3/2008 | |
| JP | 2009149837 A | * | 7/2009 | |
| JP | 2009203444 A | * | 9/2009 | |
| JP | 2009-221289 A | | 10/2009 | |
| JP | 2009-256517 A | | 11/2009 | |
| JP | 2011-208865 A | | 10/2011 | |
| JP | 2013-256928 A | | 12/2013 | |
| JP | 2015098582 A | * | 5/2015 | |
| JP | 2015160433 A | * | 9/2015 | |
| JP | 2016035347 A | * | 3/2016 | |
| JP | 2016070542 A | * | 5/2016 | |
| JP | 2016-155895 A | | 9/2016 | |
| JP | 2016-190990 A | | 11/2016 | |
| JP | 2017075773 A | * | 4/2017 | |
| JP | 2017-523061 A | | 8/2017 | |
| JP | 2017-179306 A | | 10/2017 | |
| JP | 2018-059682 A | | 4/2018 | |
| JP | 2018123217 A | * | 8/2018 | |
| KR | 2017122003 A | * | 11/2017 | ............. B21D 13/04 |
| KR | 2017122435 A | * | 11/2017 | ............. B32B 27/20 |
| WO | WO-0144742 A1 | * | 6/2001 | ............. B05B 7/1495 |
| WO | WO-2012128379 A1 | * | 9/2012 | ............... C09K 5/16 |
| WO | WO-2012133258 A1 | * | 10/2012 | ........... F28D 20/003 |
| WO | WO-2013080611 A1 | * | 6/2013 | ........... B23K 35/286 |
| WO | WO-2015194364 A1 | * | 12/2015 | ............... F01N 3/24 |
| WO | WO-2016017782 A1 | * | 2/2016 | ............... G02B 1/04 |
| WO | WO-2016035562 A1 | * | 3/2016 | ............... F01N 5/02 |
| WO | WO-2018105617 A1 | * | 6/2018 | ............... C08L 1/02 |

OTHER PUBLICATIONS

Machine Translation of JP-2015098582-A, May 2015 (Year: 2015).*
Machine Translation of JP-2015160433-A, May 2015 (Year: 2015).*
Machine Translation of JP-2016035347-A, Mar. 2016 (Year: 2016).*
Machine Translation of DE-202016103148-U1, Sep. 2016 (Year: 2016).*
Machine Translation of WO-2018105617-A1, Jun. 2018 (Year: 2018).*
Machine Translation of JP-2018123217-A, Aug. 2018 (Year: 2018).*
International Search Report dated Jan. 28, 2020, issued in counterpart International Application No. PCT/JP2019/049770 (3 pages, including patent family annex).
Supplementary European Search Report dated Aug. 11, 2022, issued in counterpart Application No. 19897649. (2 pages).

* cited by examiner

[FIG. 1]
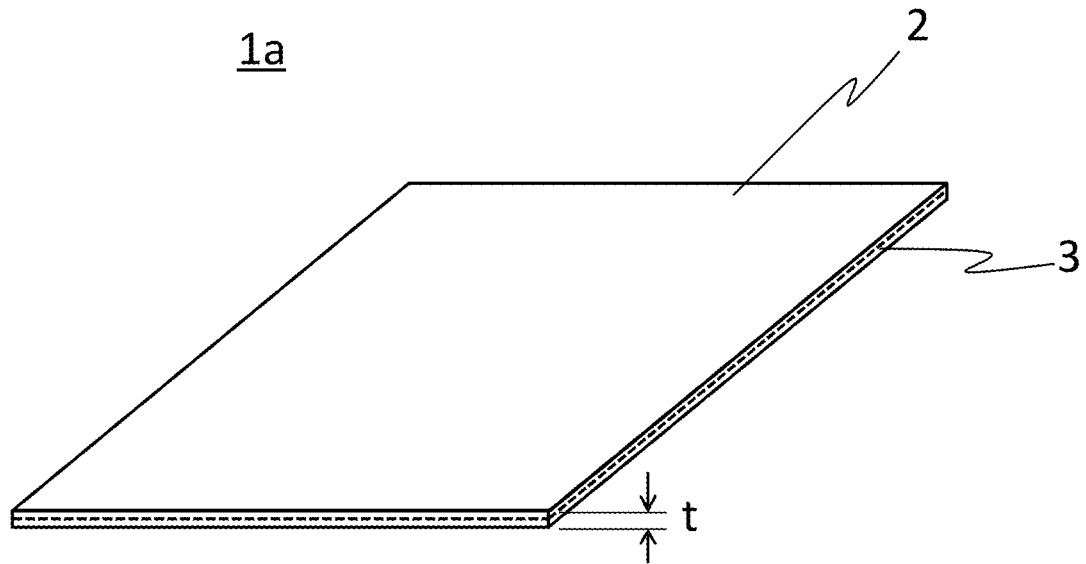
[FIG. 2]
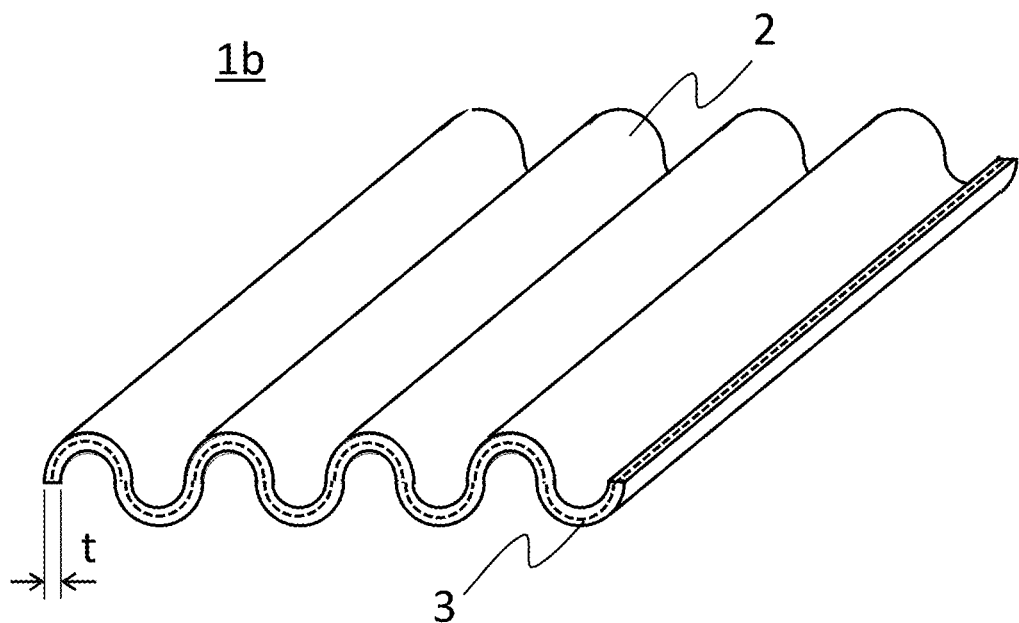

[FIG. 3]
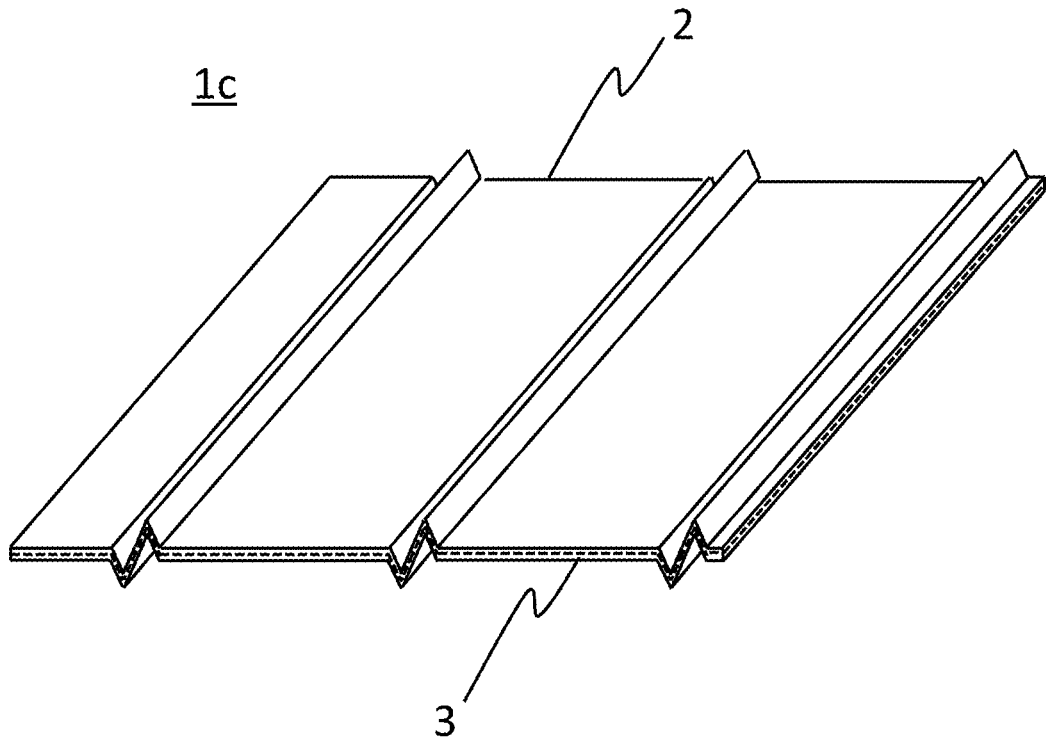
[FIG. 4]
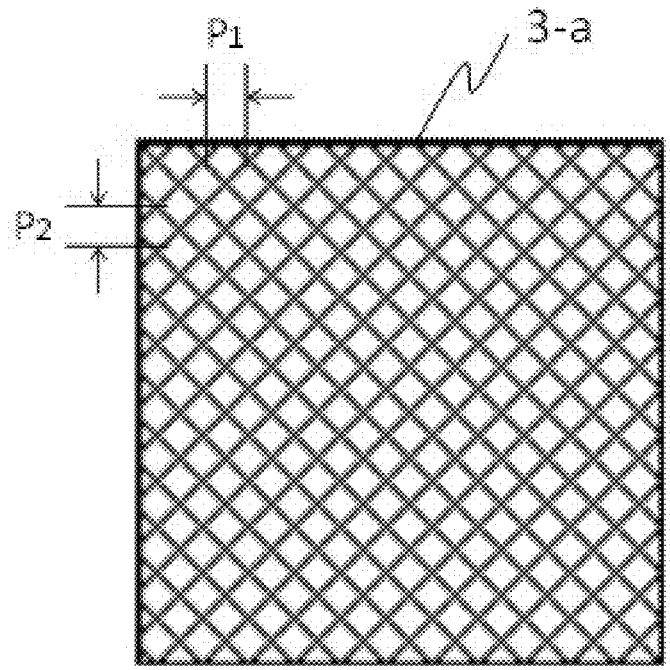

[FIG. 5]
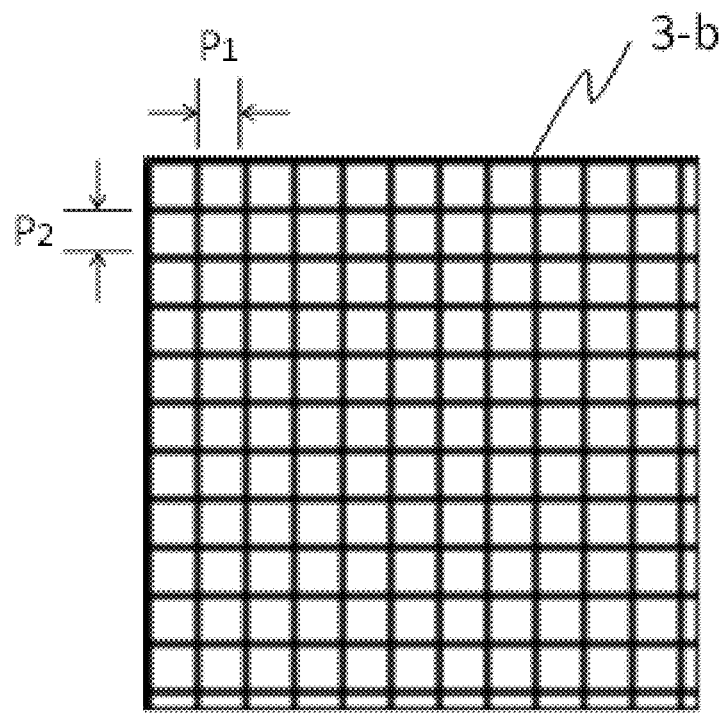
[FIG. 6]
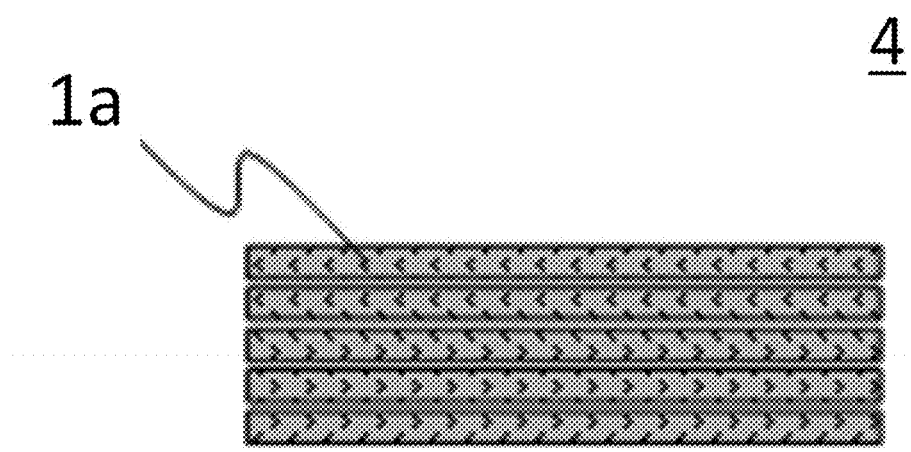

[FIG. 7]
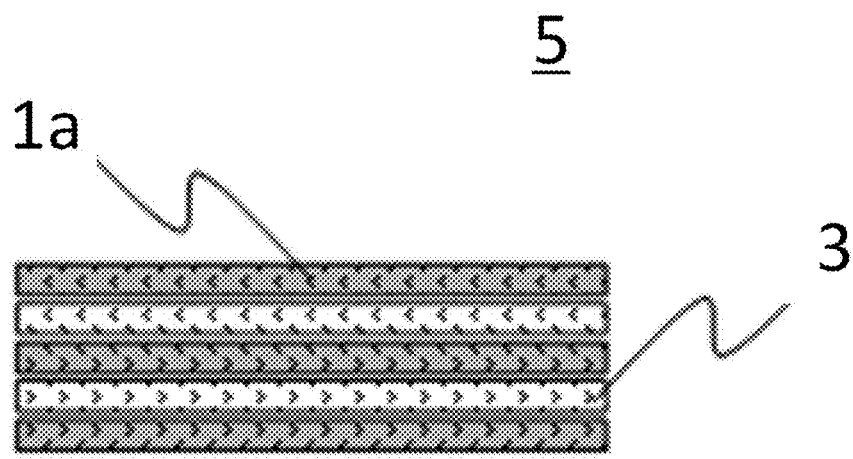
[FIG. 8]
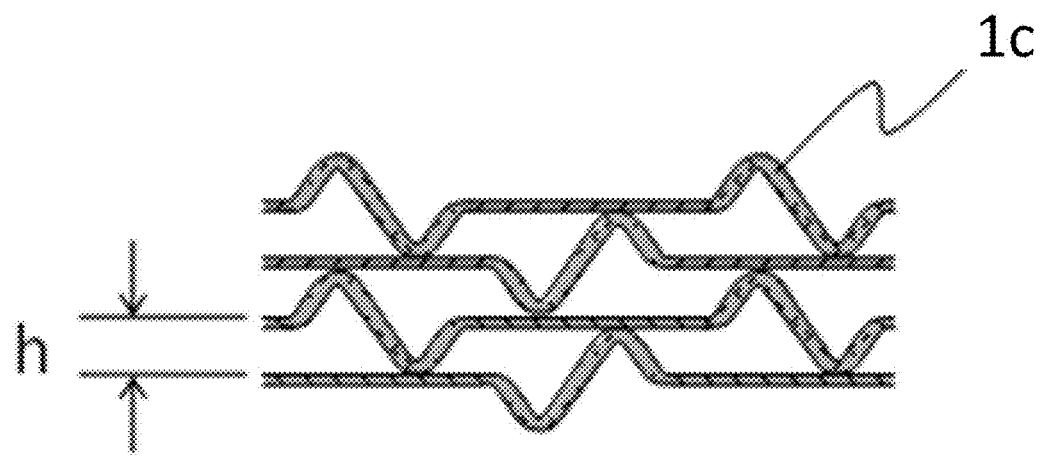

[FIG. 9]
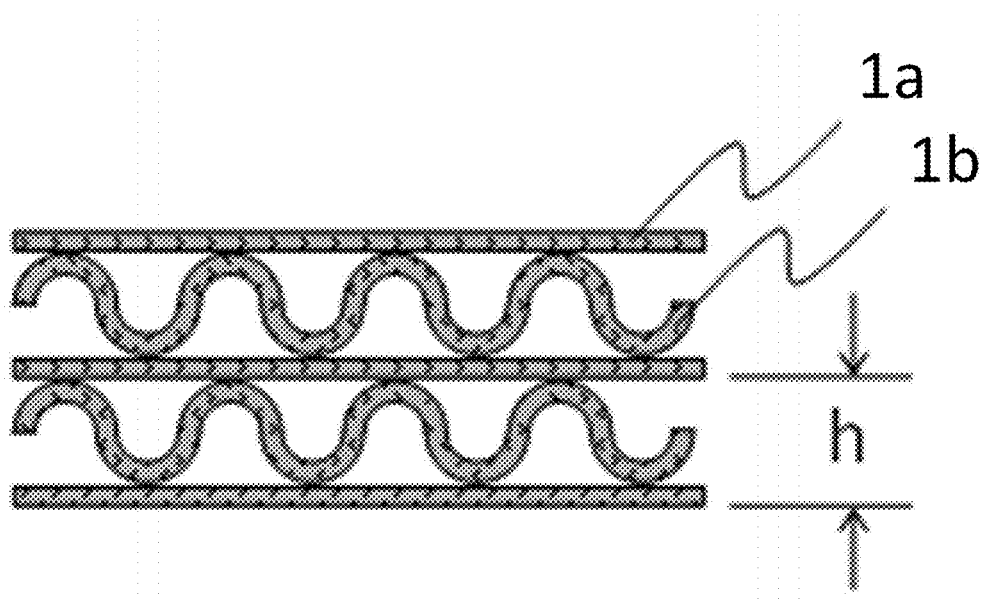

PLATY CHEMICAL HEAT-STORAGE OBJECT

TECHNICAL FIELD

The present invention relates to a plate-shaped chemical heat storage.

BACKGROUND ART

A latent heat storage material that utilizes the phase change of a substance is known as one of the heat storage technologies. For example, PATENT DOCUMENT 1 discloses a heat storage in which a plurality of latent heat storage particles are placed on a sheet, and a paint is applied thereon to fix the particles to the sheet. In this heat storage, a coating film covers so that the heat storage material does not leak to the outside when it changes to a liquid or gas due to a phase change.

A chemical heat storage material is known as another heat storage technology. In the chemical heat storage material, a gaseous working medium such as water reacts with the chemical heat storage material, and the heat absorption or heat generation at that time is utilized. It is said that the chemical heat storage material has a higher amount of heat storage per unit mass than the latent heat storage material or the sensible heat storage material. As a chemical heat storage material, for example, PATENT DOCUMENT 2 discloses a heat storage member obtained by molding a powder of a metal oxide such as calcium oxide or magnesium oxide into a plate shape.

PATENT DOCUMENT 3 discloses a chemical heat storage material comprising a basket-shaped structure having a large number of pores obtained by mixing a clay mineral and a flammable granular material to obtain a mixture and firing the mixture, and chemical heat storage material supported on an outer surface of the basket-shaped structure and inside the pores of the basket-shaped structure.

PATENT DOCUMENT 4 discloses a chemical heat storage material molded body comprising a skeletal structure composed of porous ceramics having a large number of pores, a chemical heat storage material supported on an outer surface of the skeletal structure, or the outer surface and inside the pores of the skeletal structure.

CITATION LIST

Patent Documents

[PATENT DOCUMENT 1] JP H08-29081 A
[PATENT DOCUMENT 2] JP 2011-208865 A
[PATENT DOCUMENT 3] JP 2009-256517 A
[PATENT DOCUMENT 4] JP 2009-221289 A

SUMMARY OF THE INVENTION

Problems to be Resolved by the Invention

An object of the present invention is to provide a plate-shaped chemical heat storage having excellent durability.

Means to Solve the Problems

Studies for solving the above problems have resulted in completion of the present invention including the following aspects.

[1] A plate-shaped chemical heat storage comprising a substrate composed of a metal net and a heat storage material composition supported on the substrate, wherein the heat storage material composition comprises at least one selected from the group consisting of magnesium hydroxide or oxide, strontium hydroxide or oxide, barium hydroxide or oxide, calcium hydroxide or oxide, and calcium sulfate.

[2] The plate-shaped chemical heat storage according to [1], wherein the heat storage material composition further comprises at least one selected from the group consisting of titanium dioxide, silicon dioxide, alumina silicate fiber, E glass fiber, and cellulose.

[3] The plate-shaped chemical heat storage according to [1] or [2], wherein the net comprises at least one selected from the group consisting of stainless steel, aluminum, aluminum alloy, copper, and copper alloy.

[4] The plate-shaped chemical heat storage according to any one of [1] to [3], wherein the plate thickness is not less than 0.3 mm and not more than 2 mm.

[5] A chemical heat storage structure composed of a stacked product comprising at least one of the plate-shaped chemical heat storage according to any one of [1] to [4].

[6] A chemical heat storage system comprising the plate-shaped chemical heat storage according to any one of [1] to [4] or the chemical heat storage structure according to [5].

Advantageous Effects of the Invention

The plate-shaped chemical heat storage of the present invention has excellent shape retention and quick thermal response. In the plate-shaped chemical heat storage of the present invention, gas such as water vapor easily penetrates to the inside deep, the efficiency of endothermic reaction and exothermic reaction is high, and the amount of heat storage per unit weight is high. In the plate-shaped chemical heat storage of the present invention, even if the volume change due to the dehydration reaction/hydration reaction on the heat storage material occurs, the substrate composed of the net absorbs the volume change and prevents cracking and pulverization, and a performance of the heat storage/heat dissipation can be maintained high for a long period of time.

BRIEF DESCRIPTION OF THE DRAWINGS

FIG. 1 is a figure which shows an example of the plate-shaped chemical heat storage of the present invention.

FIG. 2 is a figure which shows an example of the plate-shaped chemical heat storage of the present invention.

FIG. 3 is a figure which shows an example of the plate-shaped chemical heat storage of the present invention.

FIG. 4 is a figure which shows an example of the substrate used for the plate-shaped chemical heat storage of the present invention.

FIG. 5 is a figure which shows an example of the substrate used for the plate-shaped chemical heat storage of the present invention.

FIG. 6 is a figure which shows an example of the chemical heat storage structure of the present invention.

FIG. 7 is a figure which shows an example of the chemical heat storage structure of the present invention.

FIG. 8 is a figure which shows an example of the chemical heat storage structure of the present invention.

FIG. 9 is a figure which shows an example of the chemical heat storage structure of the present invention.

EMBODIMENTS FOR CARRYING OUT THE INVENTION

The plate-shaped chemical heat storage 1 of the present invention comprises a substrate 3 and a heat storage material composition 2 supported on the substrate 3.

The substrate 3 used in the present invention is composed of a metal net. The net may be any of a braided wire rod, a cut and stretched plate material (expanded metal), a perforated plate material (punching metal), and the like.

The material of the net is not particularly limited as long as it is a metal, but a metal having a higher thermal conductivity than the heat storage material composition is preferable, and stainless steel, aluminum, an aluminum alloy, copper, or a copper alloy is preferable.

The mesh size of the net is not particularly limited, but is preferably 10 μm or more, more preferably 100 μm or more, still more preferably not less than 1 mm and not more than 5 mm, from the viewpoint that the heat storage material composition is difficult to peel off from the substrate and the thermal conductivity between the heat storage material composition and the substrate is enhanced.

The net can be a flat net with a flat main surface, a bump net with bump-shaped ridges on the main surface, a corrugated net with wavy ridges on the main surface, a rib net with protrusions on the main surface, or so on. Since the heat storage material composition enters the mesh and exerts an anchor effect, even a flat net exhibits sufficient strength. For bump net, corrugated net or rib net, bumps, waves or ribs can be expected to further enhance the anchor effect.

The heat storage material composition used in the present invention comprises a chemical heat storage material. As the chemical heat storage material, used is at least one selected from the group consisting of magnesium hydroxide or oxide, strontium hydroxide or oxide, barium hydroxide or oxide, calcium hydroxide or oxide, and calcium sulfate.

A hydroxide or oxide of magnesium is a chemical heat storage material that utilizes heat storage when magnesium hydroxide is dehydrated and converted to magnesium oxide and heat dissipation when magnesium oxide is hydrated and converted to magnesium hydroxide. The heat storage operating temperature of magnesium hydroxide or oxide is around 350° C.

A hydroxide or oxide of strontium is a chemical heat storage material that utilizes heat storage when strontium hydroxide is dehydrated and converted to strontium oxide and heat dissipation when strontium oxide is hydrated and converted to strontium hydroxide.

A hydroxide or oxide of barium is a chemical heat storage material that utilizes heat storage when barium hydroxide is dehydrated and converted to barium oxide and heat dissipation when barium oxide is hydrated and converted to barium hydroxide.

A hydroxide or oxide of calcium is a chemical heat storage material that utilizes heat storage when calcium hydroxide is dehydrated and converted to calcium oxide and heat dissipation when calcium oxide is hydrated and converted to calcium hydroxide. The heat storage operating temperature of calcium hydroxide or oxide is around 500° C.

Calcium sulfate is a chemical heat storage material that utilizes heat storage when calcium sulfate 0.5 hydrate is dehydrated and changed to anhydrous calcium sulfate and heat dissipation when anhydrous calcium sulfate is hydrated and changed to calcium sulfate 0.5 hydrate. The heat storage operating temperature of calcium sulfate is around 90° C.

The heat storage material composition used in the present invention may comprise additives such as a heat conductive filler, reinforcing fibers, or binder in addition to the above chemical heat storage material.

Examples of the heat conductive filler can include molten silica, aluminum oxide, boron nitride, aluminum nitride, silicon nitride, magnesium carbonate, carbon nanotubes, boron nitride nanotubes, beryllium oxide and the like.

Examples of the reinforcing fiber can include carbon fiber, glass fiber, alumina silicate fiber, E glass fiber, aramid fiber, polyolefin fiber, vinylon fiber, steel fiber and the like.

As the other filler, mentioned are titanium dioxide, zeolite, activated white earth, sepiolite, bentonite, parigolstite, hydrotalcite, zinc oxide, iron oxide, barium sulfate, calcium carbonate, talc, aluminum hydroxide, antimony oxide, graphite, ferrite, etc. Of these, a filler in which the heat storage material composition supported on the substrate becomes porous is preferably used.

Examples of binder can include an inorganic binder such as silica sol, silicate, phosphate, cement and silicone; an organic binder such as cellulose acetate, nitrile cellulose, cellulose, polyvinylidene fluoride, polyvinyl alcohol, styrene butadiene rubber, nitrile rubber, polytetrafluoroethylene, polypropylene, polyethylene, acrylic resin, and epoxy resin.

Of these additives, at least one selected from the group consisting of titanium dioxide, silicon dioxide, alumina silicate fiber, E glass fiber, and cellulose can be preferably contained in the heat storage material composition.

The total amount of the additives is preferably not less than 1% by weight and not more than 40% by weight with respect to the total amount of the chemical heat storage material.

In the plate-shaped chemical heat storage of the present invention, the heat storage material composition is supported on the substrate, more specifically, on the outer surface of the net constituting the substrate and in the mesh of the net.

The supporting can be carried out by applying a slurry or paste of the heat storage material composition to the substrate and drying it, by compacting the powder of the heat storage material composition together with the substrate, or by another supporting method.

The plate-shaped chemical heat storage of the present invention has a plate thickness t of preferably 0.3 mm or more and 2 mm or less, and more preferably 0.5 mm or more and 1 mm or less.

The surface of the plate-shaped chemical heat storage of the present invention may be completely covered with the heat storage material composition, or a part of the substrate may be exposed.

The main surface of the plate-shaped chemical heat storage of the present invention may be a smooth surface or a rough surface. When the surface is rough, a slight gap is formed when the plate-shaped chemical heat storage of the present invention is stacked, and water, which is an operating medium for the chemical heat storage material, easily penetrates to the inside deep. From such a viewpoint, the surface roughness of the main surface is preferably several μm to several hundred μm.

The plate-shaped chemical heat storage of the present invention may be cut into chips, bent into a tubular shape or a box shape, or embossed to be wavy (for example, shape as shown in FIGS. 2 and 3). Further, a plurality of plate-shaped chemical heat storages of the present invention can be stacked, or can be stacked with other plate-shaped materials.

The chemical heat storage structure of the present invention comprises a stacked product comprising at least one plate-shaped chemical heat storage of the present invention.

FIG. 6 shows a chemical heat storage structure 4 in which a large number of plate-shaped chemical heat storages 1a of the present invention are stacked. When there is a gap between adjacent plate-shaped chemical heat storages 1a, water vapor, which is an operating medium, easily passes through this gap. The chemical heat storage structure 4 has a high packing density of the chemical heat storage material per unit volume, can exhibit higher performance of heat storage/heat dissipation, and can stably maintain its shape for a long period of time.

FIG. 7 shows a chemical heat storage structure 5 in which a plate-shaped chemical heat storage 1a of the present invention and another plate-shaped material 3 are alternately stacked.

The other plate-shaped material 3 is not particularly limited, and may be, for example, a substrate 3-a made of a metal net on which no heat storage material composition is supported. In the chemical heat storage structure 5, the plate-shaped material 3 acts as a spacer and the flow path to the plate-shaped chemical heat storage 1 is expanded, and water vapor, which is an operating medium, easily flows to facilitate reaction of dehydration/hydration.

FIG. 8 shows a structure in which plate-shaped chemical heat storage 1c in which ridges and flat portions are alternately formed at predetermined intervals as shown in FIG. 3 are stacked.

FIG. 9 shows a corrugated honeycomb-like structure in which a plate-shaped chemical heat storage 1a and a plate-shaped chemical heat storage 1b as shown in FIG. 2 are alternately stacked.

The stacking height h at this is not particularly limited, but is preferably set to 2 mm or more and 4 mm or less.

In the structure of the present invention, since the substrate functions as a frame material, it is possible to maintain high strength and shape retention for a long period of time. In addition, as long as the form exhibits the action and effect in the present invention, it is not limited to the above, and other shapes may be used.

Examples of the present invention will be shown below, and the present invention will be described in more detail. It should be noted that these are merely examples for explanation, and the present invention is not limited thereto.

Example 1

Water was added to 10 kg of magnesium hydroxide powder and kneaded with a kneader. Thereto, 4 kg of silica-alumina fibers were added, and the mixture was further kneaded to obtain a paste-like chemical heat storage material composition having a water content of about 40%. Using a rolling machine with a pair of rollers, the paste-like chemical heat storage material composition was applied on an expanded metal substrate (metal lath plate, $P_1$=4.5 mm, $P_2$=3.0 mm) made of SUS 430 having a width of 500 mm so as to fill a mesh of the metal lath plate. Then, it was cut to a length of 500 mm with a cutting machine. This was dried at 120° C. for 2 hours. Then, it was cut into small pieces of 50×50 mm to obtain a plate-shaped chemical heat storage having a thickness of 0.7 mm. The density of the heat storage material composition supported in the plate-shaped chemical heat storage was 0.95 g/cm$^3$.

Example 2

A plate-shaped chemical heat storage was obtained in the same manner as in EXAMPLE 1 except that the expanded metal substrate made of SUS 430 used in Example 1 was changed to an expanded metal substrate made of aluminum (metal lath plate, $P_1$=4.5 mm, $P_2$=3.0 mm). The density of the heat storage material composition supported in the plate-shaped chemical heat storage was 0.92 g/cm$^3$.

Comparative Example 1

Magnesium hydroxide powder (manufactured by Kishida Chemical Co., Ltd.) was placed in a tableting machine, and a pressure of 700 kg/cm$^2$ was applied for 10 seconds to obtain a pellet-shaped heat storage having a diameter of 13 mm and a thickness of 2.4 mm. The density of the pellet-shaped heat storage was 0.94 g/cm$^3$.

Evaluation

A durability test was carried out under the conditions shown in Table 1 with one cycle of dehydration treatment and hydration treatment. The shape, dehydration ratio and hydration ratio of the heat storage were recorded for each cycle. The results are shown in Table 2.

The dehydration ratio was calculated assuming that the initial magnesium hydroxide was completely converted to magnesium oxide as 100%. The hydration ratio was calculated assuming that all magnesium oxide was reconverted to the initial magnesium hydroxide weight as 100%.

The pellet-shaped heat storage of COMPARATIVE EXAMPLE 1 was in a state where cracks were generated in the second cycle, cracks were generated in the entire surface of the pellets in the fifth cycle, and magnesium powder was attached to hands when touched.

On the other hand, in the plate-shaped chemical heat storages of EXAMPLES 1 and 2, minute cracks were visually observed in a part of the heat storage material composition in the 5th cycle, but no detachment or peeling from the substrate was observed, and magnesium powder did not stick to the hands when touched.

As shown in Table 2, the plate-shaped chemical heat storages of EXAMPLES 1 and 2 had higher dehydration ratio and hydration ratio than the pellet-shaped heat storage of COMPARATIVE EXAMPLE 1, and were excellent in heat storage performance.

As is clear from the above results, the plate-shaped chemical heat storage of the present invention has high strength and high reaction efficiency of dehydration/hydration. By using the plate-shaped chemical heat storage of the present invention, it is possible to construct a high-performance and highly durable chemical heat storage system as compared with the case of using the conventional powder-shaped or pellet-shaped heat storage.

TABLE 1

|  | Dehydration | Hydration |
| --- | --- | --- |
| Ambience Temp.[° C.] | In the air 400 | In the air 85 |

TABLE 1-continued

|  | Dehydration | Hydration |
|---|---|---|
| WaterVapor Pressure [kPa] | <4 | 58 |
| Processing Time [hr] | 0.5 | 5 |

TABLE 2

|  | Dehaydration ratio [%] | | | | | Hydration ratio [%] | | | | |
|---|---|---|---|---|---|---|---|---|---|---|
|  | 1st | 2nd | 3rd | 4th | 5th | 1st | 2nd | 3rd | 4th | 5th |
| Ex. 1 | 96 | 92 | 92 | 92 | 92 | 93 | 92 | 92 | 91 | 91 |
| Ex. 2 | 97 | 95 | 95 | 94 | 94 | 93 | 94 | 93 | 92 | 93 |
| Comp. Ex. 1 | 89 | 98 | 99 | 99 | 95 | 85 | 80 | 78 | 76 | 74 |

EXPLANATION OF SYMBOLS 1a, 1b, 1: plate-shaped chemical heat storage
2: heat storage material composition
3: substrate
3-a: substrate composed of a metal net
3-b: substrate composed of an expanded metal
4: heat storage structure
5: heat storage structure

The invention claimed is:

1. A plate-shaped chemical heat storage comprising a substrate composed of a metal net and a layer of a heat storage material composition, wherein the heat storage material is supported on the substrate,
   wherein the heat storage material composition comprises a chemical heat storage material and at least one additive selected from the group consisting of titanium dioxide, silicon dioxide, alumina silicate fiber, E glass fiber, and cellulose,
   wherein the plate-shaped chemical heat storage has a plate thickness of 0.3 mm or more and 2 mm or less and has a waveform shape having an amplitude higher than the plate thickness and an outer surface layer composed of the heat storage material composition is arranged along the outer surfaces of the metal net.

2. The plate-shaped chemical heat storage according to claim 1, wherein the at least one additive further comprises an additional additive selected from the group consisting of a heat conductive filler, reinforcing fibers, other than alumina silicate fiber and/or E glass fiber if already present, and binder, other than cellulose if already present.

3. The plate-shaped chemical heat storage according to claim 1, wherein a total amount of the at least one additive is not less than 1% by weight and not more than 40% by weight with respect to a total amount of the chemical heat storage material.

4. The plate-shaped chemical heat storage according to claim 1, wherein the metal net comprises at least one selected from the group consisting of stainless steel, aluminum, aluminum alloy, copper and copper alloy.

5. The plate-shaped chemical heat storage according to claim 1, wherein the metal net is composed of an expanded metal.

6. The plate-shaped chemical heat storage according to claim 1, wherein a mesh size of the net is 10 μm or more and not more than 5 mm.

7. The plate-shaped chemical heat storage according to claim 1, wherein the heat storage material composition is supported on the substrate by applying a slurry or paste of the heat storage material composition thereto or compacting a powder of the heat storage material composition therewith.

8. A chemical heat storage system comprising the plate-shaped chemical heat storage according to claim 1.

9. A chemical heat storage structure composed of a stacked product comprising at least one of the plate-shaped chemical heat storage according to claim 1.

10. A chemical heat storage system comprising the chemical heat storage structure according to claim 9.

11. A plate-shaped chemical heat storage comprising a substrate composed of a metal net and a layer of a heat storage material composition, wherein the heat storage material is supported on the substrate,
    wherein the heat storage material composition comprises at least one selected from the group consisting of magnesium hydroxide or oxide, strontium hydroxide or oxide, barium hydroxide or oxide, calcium hydroxide or oxide, and at least one additive selected from the group consisting of titanium dioxide, silicon dioxide, alumina silicate fiber, E glass fiber, and cellulose,
    wherein the plate-shaped chemical heat storage has a plate thickness of 0.3 mm or more and 2 mm or less and has a waveform shape having an amplitude higher than the plate thickness and an outer surface layer composed of the heat storage material composition is arranged along the outer surfaces of the metal net.

12. The plate-shaped chemical heat storage according to claim 11, wherein the at least one additive further comprises an additional additive selected from the group consisting of a heat conductive filler, reinforcing fibers, other than alumina silicate fiber and/or E glass fiber if already present, and binder, other than cellulose if already present.

13. The plate-shaped chemical heat storage according to claim 11, wherein a total amount of the at least one additive is not less than 1% by weight and not more than 40% by weight with respect to a total amount of the chemical heat storage material.

14. The plate-shaped chemical heat storage according to claim 11, wherein the metal net comprises at least one selected from the group consisting of stainless steel, aluminum, aluminum alloy, copper and copper alloy.

15. The plate-shaped chemical heat storage according to claim 11, wherein the metal net is composed of an expanded metal.

16. The plate-shaped chemical heat storage according to claim 11, wherein a mesh size of the net is 10 μm or more and not more than 5 mm.

17. The plate-shaped chemical heat storage according to claim 11, wherein the heat storage material composition is supported on the substrate by applying a slurry or paste of the heat storage material composition thereto or compacting a powder of the heat storage material composition therewith.

18. A chemical heat storage system comprising the plate-shaped chemical heat storage according to claim 11.

19. A chemical heat storage structure composed of a stacked product comprising at least one of the plate-shaped chemical heat storage according to claim 11.

20. A chemical heat storage system comprising the chemical heat storage structure according to claim 19.

* * * * *